United States Patent [19]
Dederra et al.

[11] 4,055,044
[45] Oct. 25, 1977

[54] ROCKET ENGINE CONSTRUCTION AND CONNECTION FOR CLOSED AND OPENED FLUID COOLING CIRCUITS FOR THE WALLS THEREOF

[75] Inventors: Helmut Dederra, Ottobrunn; Günther Schmidt, Unterhaching; Jürgen Stanke, Ottobrunn, all of Germany

[73] Assignee: Messerschmitt-Bolkow-Blohm GmbH, Munich, Germany

[21] Appl. No.: 522,990

[22] Filed: Nov. 11, 1974

[30] Foreign Application Priority Data

Nov. 13, 1973 Germany ............................ 2356572

[51] Int. Cl.² .......................... F02K 9/02; F02K 11/02
[52] U.S. Cl. ........................................ 60/265; 60/267; 239/127.3
[58] Field of Search ................... 60/267, 265, 204; 239/127.1, 127.3

[56] References Cited

U.S. PATENT DOCUMENTS

| | | | |
|---|---|---|---|
| 2,935,841 | 5/1960 | Myers et al. | 239/127.1 |
| 3,048,966 | 8/1962 | Feraud et al. | 60/267 |
| 3,267,664 | 8/1966 | Jones et al. | 60/267 |
| 3,303,654 | 2/1967 | Bringer | 239/127.3 |
| 3,595,023 | 7/1971 | Stockel | 60/267 |
| 3,597,923 | 8/1971 | Simon | 60/267 |
| 3,605,412 | 9/1971 | Stockel | 60/267 |

FOREIGN PATENT DOCUMENTS

1,089,055  11/1967  United Kingdom ................... 60/267

*Primary Examiner*—Carlton R. Croyle
*Assistant Examiner*—Robert E. Garrett
*Attorney, Agent, or Firm*—McGlew & Tuttle

[57] ABSTRACT

A fluid cooled rocket, comprises a tubular housing which forms an interior combustion chamber which has a closed end formed by a head containing a propellant component injector, and an opposite opened end forming a thrust gas discharge. The housing side walls define an interior combustion chamber of uniform diameter, adjacent the closed head, is formed into an inwardly converging portion, a nozzle neck portion of smallest diameter, and an outwardly diverging portion, all proceed in a direction from the closed end toward the opposite gas discharge open end. The inwardly converging portion and the nozzle neck portion, and at least a part of the diverging portion, is formed with a first wall construction having a plurality of circumferentially arranged longitudinally extending first cooling channels, which are connected at the ends adjacent the opened discharge end with an annular inlet duct and at the end adjacent the closed head, with an annular discharge duct, which is advantageously connected to the injector. The first cooling channels are therefor connected in a closed circuit from the supply pump to the injector. At least one second set of cooling channels are formed in at least a part of the remaining portion of the divergent section, and their outer ends are opened to discharge in the direction of thrust. The inner ends of the second cooling channels are connected to an inlet which, for example, may be formed directly adjacent the inlet for the first cooling channel and which may be connected so as to be bled from a portion of the flow to the first cooling channel, with the quantity of flow being much less. The construction advantageously includes abutting flanges of the sections forming the distinct cooling channels with one flange being formed integral with the inlet for the first cooling channels and with a nozzle flow passage defined between the annular inlet duct of the first cooling passage to an annular flow space defined in the flange of the second cooling channel portion. The construction may also include an intermediate section between the first and second cooling channels in the divergent portion of the combustion chamber walls.

5 Claims, 5 Drawing Figures

ROCKET ENGINE CONSTRUCTION AND CONNECTION FOR CLOSED AND OPENED FLUID COOLING CIRCUITS FOR THE WALLS THEREOF

FIELD AND BACKGROUND OF THE INVENTION

This invention relates in general to the construction of rocket engines and, in particular, to a new and useful fluid cooled rocket engine combustion chamber having walls with cooling channels therein, which are divided longitudinally, and which includes at least one section wherein a propellant cooling fluid is circulated through cooling channels which are opened at their outer ends to discharge in the direction of thrust.

DESCRIPTION OF THE PRIOR ART

Numerous proposals have been made for arranging the cooling channels of fluid cooled rocket engine combustion chambers. In order to cope with the thermal stresses, particularly in the neck or throat section of the thrust nozzles, it is best known to use three mutually independent cooling systems, namely, one for the divergent portion of the thrust nozzle wall, one for the convergent portion of the thrust nozzle wall and for the wall of the rocket combustion chamber, and one which is particularly for the replaceable throat section. With such a design, it is difficult to use the propellant quantities which leave the various sections at different temperatures.

In a known arrangement, there is provided a main coolant circuit, including passages through which the entire wall of the nozzle inclusive of the combustion chamber is cooled in countercurrent flow, and which includes a partly opened coolant circuit for the throat section which is advantageously designed as a replaceable insert. The propellant volume of the main coolant circuit is supplied to the injector head of the combustion chamber. The partial coolant volume of the open coolant circuit cools the wall of the throat section insert first regeneratively and, thereupon, by film cooling. Because of the pressure increase in the last portion of the coolant circuit, the regenerative cooling of the entire nozzle, including the combustion chamber, requires relatively thick walls of the cooling tubes.

A further disadvantage of the known constructions is particularly apparent when the rocket engines are operated in a vacuum condition. In such engines, the downstream final portion of the nozzle must be flared by an amount greater than the optimal flaring for ground-tested rocket nozzles. This results in an expensive construction, and correspondingly higher costs. In order to permit ground-testing, the engines equipped with nozzles for vacuum operation have to be operated in a vacuum chamber.

SUMMARY OF THE INVENTION

The present invention provides a rocket engine combustion chamber construction wherein the thrust nozzle comprises at least two independent cooling circuits in which the cooling is ensured by the formation of cooling flow structures of relatively light construction so that the coolant losses are low, and which are constructed so that they can be tested on the ground in an inexpensive manner. To this end, in accordance with the invention, there is provided an opened coolant circuit having its inlet closely adjacent the downstream inlet of the first or closed coolant circuit or circuits. With the construction, the opened coolant circuit cools the thrust nozzle wall which extends in the divergent nozzle section to the open nozzle discharge. The invention provides the advantages of the known constructions without their disadvantages. If only one closed coolant circuit is provided, its inlet is located approximately in the middle of the divergent portion of the nozzle. Therefore, during its passage to the outlet which is located at the injection head, the coolant is heated up only to an extent which permits it to cope with the pressures which are produced while using usual materials and wall thicknesses for the cooling tubes.

The open coolant circuit cooling the downstream portion of the nozzle requires only thin tubes into which approximately 1% of the entire coolant quantity is supplied under a relatively low pressure to pass therethrough in parallel flow. The high temperatures increase thus obtainable causes the propellant used as a coolant to leave the thin tubes at a high velocity producing an additional thrust, whereby, the propellant losses are reduced to extremely small quantities.

In the embodiments of the invention where at least two closed coolant circuits are provided, the heated up coolant of one of the circuits serves to drive auxiliary units. The sectioning into at least three, where the open circuit is considered also, coolant circuits of which the second closed circuit may cool a thermally high stressed zone of the nozzle, offers the advantage of a further thermal relief of the main coolant quantity to be supplied to the injector head, and also the possibility of utilizing the propellant quantities to be used in the auxiliary units for regenerative cooling.

In accordance with a further feature of the invention, the open circuit tubes are provided with nozzle-shaped outlets and, in the preferred form, the nozzle outlets may comprise an annular portion forming an auxiliary thrust nozzle. The open coolant circuit associated with the downstream final portion of the nozzle may, in accordance with another development of the invention, open into the interior of the thrust nozzle and the coolant thus introduced into the interior of the nozzle is used, in accordance with the invention, as a film coolant passing over the interior walls of the combustion chamber.

In accordance with a further development of the invention, either the thrust nozzle in the entire zone of the open coolant circuit is designed as a self-contained structural part and detachably connected to the fore part of the thrust nozzle, or only the portion of the thrust nozzle extending rearwardly of the coolant inlet of the open coolant circuit is designed as a self-contained extension of the thrust nozzle. In such cases, the front portion of the nozzle extending upstream of the plane of the separation between the two parts is flared so that, even under atmospheric conditions on the ground, an optimal operation of the engine is ensured. Only the detachable part of the nozzle is desigend with a divergence which is necessary for the vacuum operation. Such a construction makes it possible, after dismounting the rear portion of the nozzle or the nozzle extension, to test vacuum nozzles in ground test stands and to measure their cooling properties under real conditions.

Accordingly, it is an object of the invention to provide a rocket engine combustion chamber, which includes a first combustion chamber wall portion having circumferentially arranged longitudinally extending cooling channels therethrough which are connected in a closed circuit through an annular inlet at one end which is connected to the propellant pump and an annular discharge at the opposite or closed combustion chamber end which is connected to the injector and which includes a second section having circumferentially arranged and longitudinally extending second cooling channels which are connected to an inlet duct at its inner end, and at its outer end, it is opened to discharge in the direction of thrust, either directly to the atmosphere or into the interior of the thrust engine at the downstream end of the divergent portion of the nozzle.

A further object of the invention is to provide an improved rocket engine combustion chamber construction, wherein the walls of the divergent section are made-up of a plurality of individual parts which are flanged together with the flange part of one having an annular inlet duct for the coolant which is connected through a passage to a first set of circumferentially arranged and longitudinally extending cooling channels which extend inwardly to the closed end of the combustion chamber and which includes a construction wherein a wall of the duct which is common to the flange connection between the two parts is provided with a relatively small nozzle flow passage from the inlet to a second set of coolant cooling channels in the trailing or downstream end of the divergent section of the nozzle, which terminate in open ends for discharge of a small portion of the coolant through the open ends in the direction of thrust.

A further object of the invention is to provide a rocket engine combustion chamber construction and to an improved flange construction between two sections of the rocket combustion chamber which are simple in design, rugged in construction and economical to manufacture.

In various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
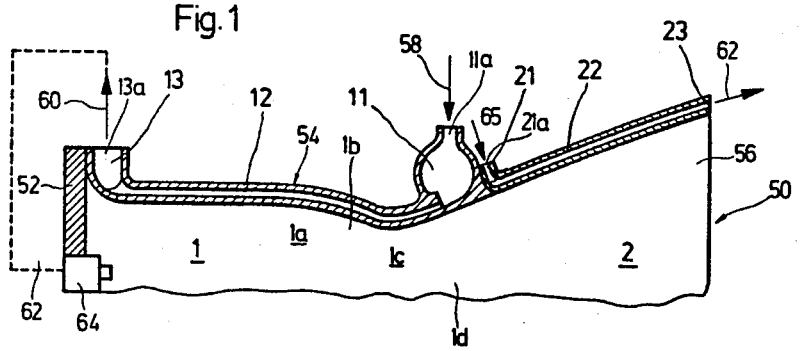
FIG. 1 is a partial longitudinal sectional view of a rocket engine constructed in accordance with the invention.

Referring to the drawings in particular, the invention embodied therein, as shown in FIG. 1, comprises a rocket engine, generally designated 50, which includes a closed end or head 52 and a tubular wall part, generally designated 54, which is divided into sections 1 and 2. Sections 1 and 2 are connected together in end-to-end relationship in order to form a combustion chamber, which includes a uniform diameter portion 1a, a converging portion 1b, a narrow neck portion or throat 1c and a divergent portion 1d. Section 2 is entirely in a divergent portion of the combustion chamber which has an opened end or thrust gas discharge 56.

In accordance with the invention, section 1 includes a plurality of circumferentially arranged longitudinally extending cooling channels 12 which are connected at their outer ends to an annular feed manifold 11. The feed manifold 11 has an intake 11a which is connected, for example, to a supply tank for a propellant component through a pump (not shown). The propellant component forms a coolant which is directed in the direction of arrow 58 through the inlet 11a and flows through each individual cooling channel 12 to an annular outlet manifold or duct 13. Duct 13 includes a connection 13a for the outflow of the propellant in the direction of arrow 60 through a conduit 62 to an injection nozzle 64 where the preheated propellant component is directed into combustion chamber 1a in the form of a spray which is reacted within the combustion chamber.

Figure 1A:
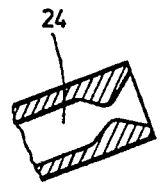
FIGS. 1a and 1b are detailed sectional views of alternate embodiments of the discharge end of the second cooling channels.
Figure 1B:
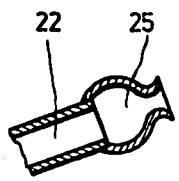

In accordance with a feature of the invention, at least a portion of the divergent section which includes both the entire section 2 and a portion 1d of section 1, is formed with cooling channels 22 which are circumferentially arranged and which extend generally longitudinally. An annular inlet 21 is connected to direct a somewhat smaller portion of a propellant component through the individual cooling channels 22 which, at the thrust nozzle discharge side 56, are opened so as to form a discharge opening 23 for directing the coolant which will probably be in a vaporized condition in the direction of the arrow 62 which is in the same general direction as the thrust gas discharge of the rocket engine. The inlet manifold 21 is provided with an inlet connection 21a for connecting it to a source of a propellant component which flows in the direction of the arrow 65. The cooling channels 22 therefor are formed by part of an open coolant circuit which has as open discharge end 23. The coolant passes at high velocity through cooling channels 22 and escapes again at the ends thereof thereby producing an additional impetus or thrust. In order to increase the thrust of the coolant which will gasify while passing through tubes 22, the end portions of tubes 22 are advantageously designed as individual nozzles 24, as shown in FIG. 1a or the ends of the individual cooling channels 22 are connected to an annular nozzle manifold 25 which provides an auxiliary thrust nozzle for supplying a uniform auxiliary thrust around the periphery of the main thrust discharge 56.

Figure 2:
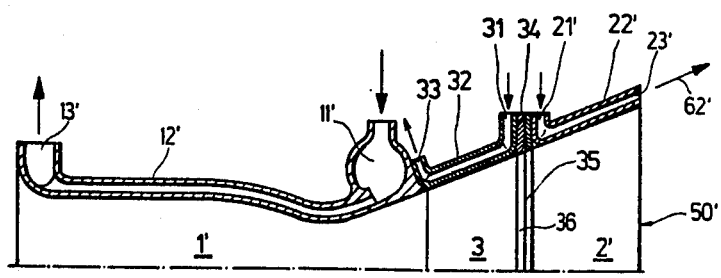
FIG. 2 is a view similar to FIG. 1 of another embodiment of the invention.

It should be appreciated that the cooling channels 12 and 22 may be designed as straight longitudinal cooling channels or they may be wound in a spiral from their inlet ends to their discharge ends In the embodiment shown in FIG. 2, there is provided a rocket engine, generaly designated 50', in which similar parts are similarly designated, but with primes. In this embodiment, section 2 is divided into section 2' and 3. Section 2' includes the cooling channels 22' which form an open circuit and which have a discharge end 23' which permits a discharge of the coolant in the direction of arrow 62'. The structural part 3 comprises an intermediate section which is cooled by a closed coolant circuit formed of longitudinally extending and circumferentially arranged coolant channels 32 which have an inlet manifold 31 adjacent the section 2' and a discharge manifold 32 adjacent the section 1'. The coolant which flows through the intermediate coolant channels 32 may be employed for the actuation of auxiliary units, which are not shown. In the emboidment of FIG. 2, the structural part 2' has a wider divergence than the section 2 of FIG. 1. Such a construction would be empolyed, for example, for operating the rocker engine in a vacuum. The structural parts 2' and 3 are provided with flanges 34 and 36, respectively, which abut at a separation plane 35.

Figure 3:
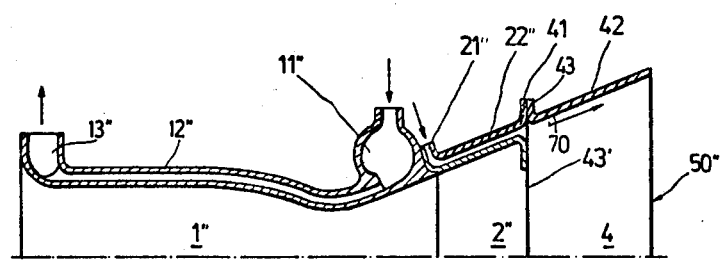
FIG. 3 is a view similar to FIG. 1 of still another embodiment of the invention.

In the embodiment of the invention shown in FIG. 3, a rocket engine 50" includes sections 1", 2" and 4. In this embodiment, the section 2" corresponds substantially to section 2' shown in FIG. 2, but instead, it has an outer end with a flange 41 which abuts against, and is connected to, a flange 43 of an outer section 4. The two flanges abut at a separation plane 43'. Outer section 4 includes a single divergent outer wall 42, and this wall is cooled by directing the gases or vapors from coolant channel 22" in the direction of arrow 70, as shown in FIG. 3. This outer wall 42 is more divergent than the structural part 2' of FIG. 2, and this is necessary for vacuum operation. The partial quantity of coolant which passes in the open circuit through tubes 22" passes over the separation joint 43 and along the walls of the interior of the outer part 4. Thus, the walls of the outer part 4 are cooled by a film cooling and, due to the high velocity and temperature of the gases, an additional thrust is produced which is directly outwardly in the same general direction as the main thrust. In order to operate rocket engine 50" on the ground and conduct tests thereof, part 4 is dismounted.

Figure 4:
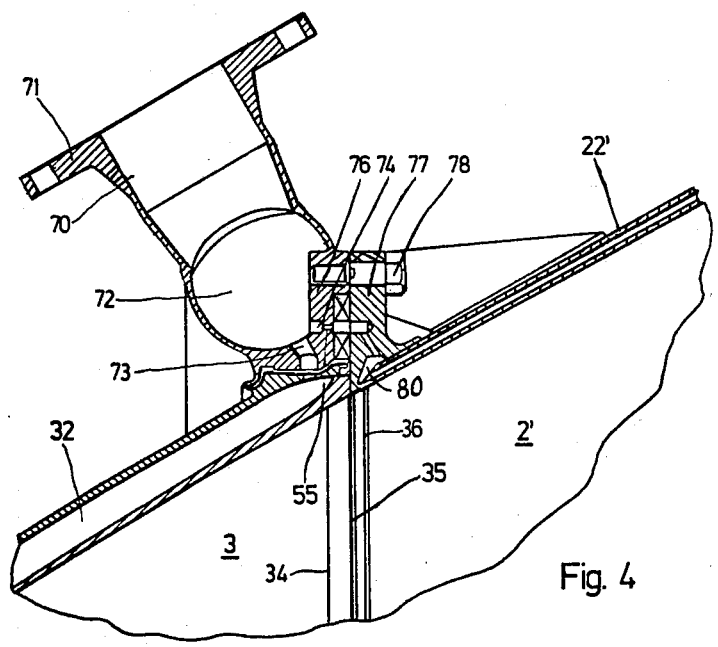
FIG. 4 is an enlarged partial sectional view of the details of construction of the flange connection between two cooling channel sections of a rocket engine combustion chamber.

FIG. 4 shows the details of construction of the interconnection of sections 2' and 3 of a type similar to that shown in FIG. 2. A feature of the construction is that the connection may be employed for supplying coolant to both the closed and open circuits. The supply or inlet assembly includes a housing, generally designated 70, forming an inlet flow passage which communciates with an annular manifold 72 which serves as a distributor for the coolant. Manifold 72 is provided with bores 73 which individually communicate with cooling channels 32 of the closed coolant circuit of structural part 3. Manifold 72 is also provided with further bores for control passages 74 in which calibrating nozzles 55 are provided and which serve to control the small quantity of coolant which will be permitted to flow from the manifold into an annular inlet duct 80 connected to the open coolant circuit through tubes 22'. The connecting flanges 34 and 36 are provided with extensions 76 and 77 which are secured to each other by means of bolts 78. A similar arrangement may also be provided for the embodiment shown in FIGS. 1 and 3.

The constructions shown in FIGS. 1 through 4 are intended only for purposes of illustration, and the various sections shown in each embodiment may be used in another sequence or in distinct lengths which are different from that indicated and in accordance with the specifal requirements of the cooling system. For example, a particular coolant circuit may be provided for the thermally high stressed throat section 1c.

While specific embodiment of the invention have been shown and described in detail to illustrate the application of the principles of the invention, it will be understood that the invention may be embodied otherwise without departing from such principles.

What is claimed is:

1. A fluid cooled rocket, comprising a tubular housing forming an interior combustion chamber having a closed end with an injector for injecting a propellant component into said combustion chamber and an opposite opened end forming a thrust gas discharge, said housing side walls defining an inwardly converging portion, a nozzle neck portion of smallest diameter, and an outwardly diverging portion extending from said closed end toward said gas discharge open end, said inwardly converging portion, said nozzle neck portion, and at least a part of said diverging portion having a first annular wall defining a first section with a plurality of circumferentially arranged longitudinally extending first cooling channels therein, a first inlet duct connected to said cooling channels adjacent the ends thereof which are toward the discharge open end, a first outlet duct connected to said cooling channels at the ends thereof adjacent said closed end and connected to said injector head for discharge into said combustion chamber, said first cooling channels and said first and second ducts being in a closed regenerative cooling fluid circuit, at least a portion of the remaining part of said diverging portion having second walls with a plurality of circumferentially arranged and longitudinally extending second cooling channels and defining a second section, means detachably connecting said second section to said first section, said second section being severable from said first section directly adjacent to said first inlet, said first section being constructed with said part of said diverging portion shaped to provide satisfactory operation for testing at atmospheric conditions on the ground, and said second detachable section having said at least a portion of the remaining part of said diverging portion shaped to provide the necessary divergence for vacuum operation, a second inlet connected to said second cooling channels at their ends thereof adjacent said closed end, the opposite ends of said cooling channels being open to permit the discharge of the coolant in the general direction of the thrust gas discharge, said first and second inlets comprising a single annular connection duct having passage connections to said first cooling tubes and said second cooling tubes.

2. A fluid cooled rocket, according to claim 1, wherein said first inlet includes an annular duct portion with a flange portion facing said second section, said second inlet including a second flange portion abutting against the flange portion of said first section and having a second inlet passage connected through said flange portion of said first section to said annular duct portion of said first inlet.

3. A fluid cooled rocket, according to claim 2, wherein said second inlet passage comprises a second annular duct and nozzle means disposed in the connection between said second annular duct and said annular duct portion of said first section for permitting a portion of the flow of the cooling liquid from said annular duct portion into said second annular duct of said second inlet.

4. A fluid cooled rocket, according to claim 1, wherein said second section comprises two portions which are detachably interconnected and both forming a portion of the divergent portion of the housing and with only the intermediate one having said second cooling channels which open at the end adjacent the other one of said portions.

5. A fluid cooled rocket, comprising a tubular housing forming an interior combustion chamber having a closed end with an injector for injecting a propellant component into said combustion chamber and an opposite opened end forming a thrust gas discharge, said housing side walls defining an inwardly converging portion, a nozzle neck portion of smallest diameter, and an outwardly diverging portion extending from said closed end toward said gas discharge open end, said inwardly converging portion, said nozzle neck portion and at least a part of said diverging portion having first walls defining a first section with a plurality of circumferentially arranged longitudinally extending first cooling channels therein, a first inlet duct connected to said cooling channels adjacent the ends thereof which are toward the discharge open end, a first outlet duct connected to said cooling channels at the ends thereof adjacent said closed end and connected to said injector head for discharge into said combustion chamber, said first cooling channels and said first and second duct being in a closed regenerative cooling fluid circuit, at least a portion of the remaining part of said diverging portion having second walls with a plurality of circumferentially arranged and longitudinally extending second cooling channels and defining a second section, means detachably connecting said second section to said first section, said second section being severable from said first section directly adjacent to said first inlet, said first section being constructed with said part of diverging portion shaped to provide satisfactory operation for testing at atmospheric conditions on the ground, and said second detachable section having said at least a portion of the remaining part of said diverging portion shaped to provide the necessary divergence for vacuum operation, a second inlet connected to said second cooling channels at their end thereof adjacent said closed end, the opposite ends of said cooling channels being open to permit the discharge of the coolant in the general direction of the thrust gas discharge, said first and second inlets comprising a single annular connection duct having passage connections to said first cooling tubes and said second cooling tubes.

* * * * *